United States Patent
Cole et al.

(10) Patent No.: US 6,778,133 B1
(45) Date of Patent: Aug. 17, 2004

(54) ERROR CORRECTION OF MESSAGES BY A PASSIVE RADAR SYSTEM

(75) Inventors: James A. Cole, East Setauket, NY (US); Robert Damis, Patchogue, NY (US); Bruce A. Leidahl, Oakdale, NY (US); John R. Keller, Huntington, NY (US)

(73) Assignee: Megadata Corporation, Greenwich, CT (US)

( * ) Notice: Subject to any disclaimer, the term of this patent is extended or adjusted under 35 U.S.C. 154(b) by 0 days.

(21) Appl. No.: 10/602,312

(22) Filed: Jun. 24, 2003

(51) Int. Cl.[7] ............................................ G01S 3/02
(52) U.S. Cl. .................. 342/357.03; 342/456; 701/120
(58) Field of Search ........................... 342/357.03, 454, 342/456; 701/117, 120, 122

(56) References Cited

U.S. PATENT DOCUMENTS 4,281,327 A * 7/1981 Frazier et al. .............. 342/135
4,685,149 A * 8/1987 Smith et al. ................ 455/524

* cited by examiner

*Primary Examiner*—Dao Phan
(74) *Attorney, Agent, or Firm*—Fay Kaplun & Marcin, LLP

(57) ABSTRACT

Receiving a message including bits corresponding to an identifier, the identifier including a unique address for a aircraft transponder, extracting the unique address from the identifier, comparing the unique address to a set of predetermined addresses, changing selected ones of the identifier bits when the unique address is not one of the set of predetermined addresses, wherein the changing of the identifier bits changes a value of the unique address in the identifier, read-comparing the updated unique address to the set of predetermined addresses and processing the message when the unique address matches one of the set of predetermined addresses.

19 Claims, 5 Drawing Sheets

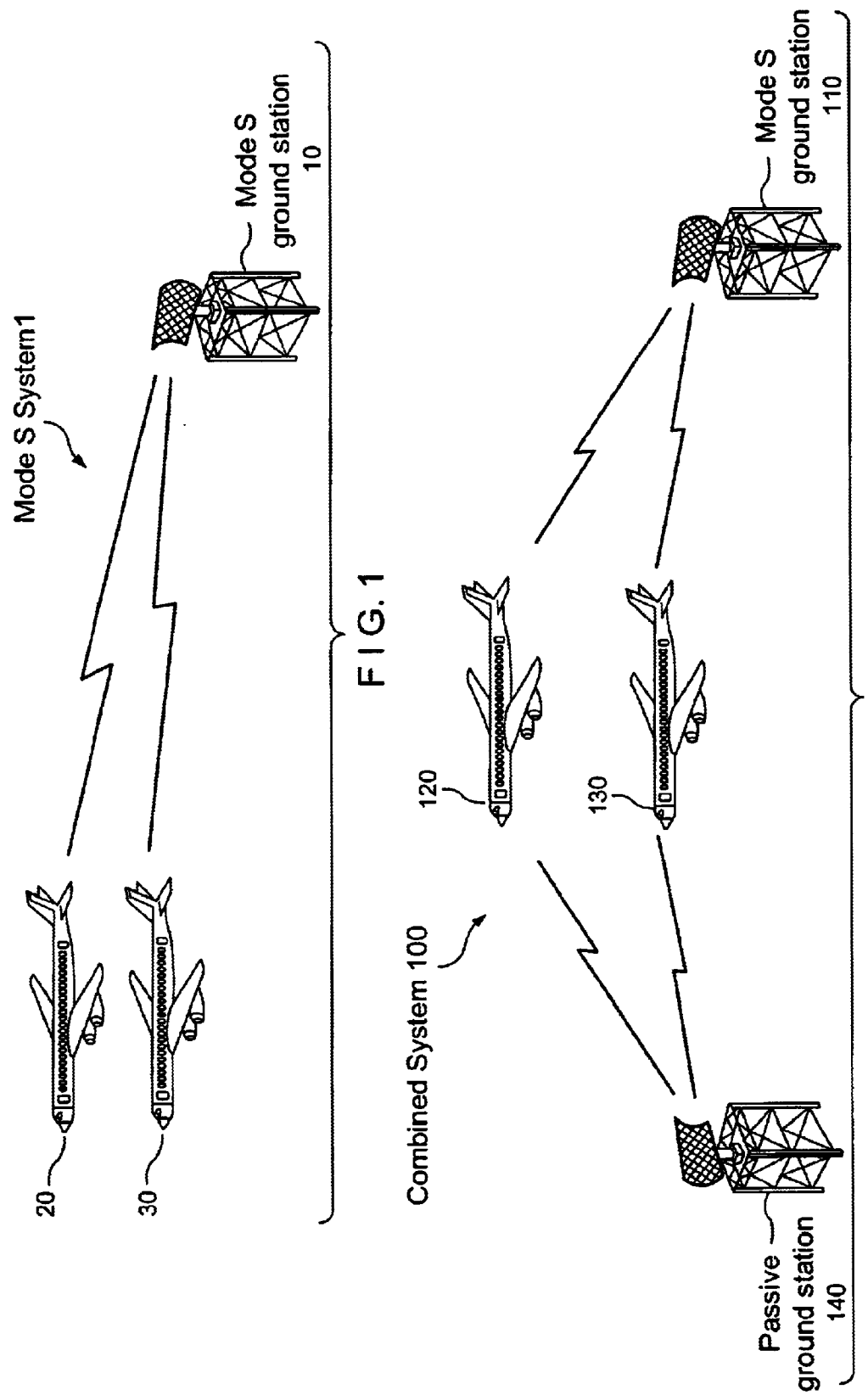

ERROR CORRECTION OF MESSAGES BY A PASSIVE RADAR SYSTEM

BACKGROUND INFORMATION

Air traffic control is a relatively new concept. Aviation did not become widespread until the end of World War I. As the air traffic increased, a control system became necessary to avoid collisions and for pilots to determine their location and the location of the airports. Initially, the air traffic control system consisted of radio devices which the pilots used to communicate with people on the ground. With the development of radar during World War II, controllers started to use radar to track civilian and military flights and the government instituted a comprehensive air traffic control system which was deployed nationwide.

However, by the late 1960's the air traffic control system was in disarray causing increases in delays and a general low efficiency for air travel. In addition, the system was not prepared to handle the fast growing increase in aircraft traffic which was occurring. A solution to the problem was the development of the Mode Select Beacon System ("Mode S") which is a ground-air-ground data link system designed to replace the aging air traffic control system.

SUMMARY OF THE INVENTION

A method, comprising the steps of receiving a message including bits corresponding to an identifier, the identifier including a unique address for a aircraft transponder, extracting the unique address from the identifier, comparing the unique address to a set of predetermined addresses, changing selected ones of the identifier bits when the unique address is not one of the set of predetermined addresses, wherein the changing of the identifier bits changes a value of the unique address in the identifier, re-comparing the updated unique address to the set of predetermined addresses and processing the message when the unique address matches one of the set of predetermined addresses.

In addition, a system, comprising a passive radar receiving a message including bits corresponding to an identifier, the identifier including a unique address, a database including a set of predetermined addresses and a processor comparing the unique address to the set of predetermined addresses and changes selected ones of the identifier bits when the unique address is not one of the set of predetermined addresses, wherein the changing of the identifier bits changes a value of the unique address in the identifier.

Furthermore, a method, comprising the steps of receiving an in-the-clear message from an aircraft transponder at a passive ground station, the message including an identifier, the identifier including a unique address for the aircraft transponder, extracting the address from the identifier, determining whether the address has been previously stored in a set of addresses corresponding to aircraft in a range of the passive ground station, storing the address in the set of addresses when the address has not been previously stored, receiving an interrogation from an active ground station at the passive ground station, the interrogation including the unique address for the aircraft transponder and error correcting the interrogation with the set of addresses.

BRIEF DESCRIPTION OF DRAWINGS

FIG. 1 shows an exemplary Mode-S air traffic control system;

FIG. 2 shows an air traffic control system including a Mode S system and an additional passive system according to the present invention;

DETAILED DESCRIPTION

Figure 3A:
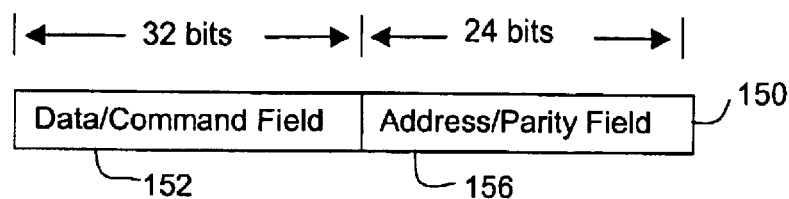
FIG. 3a shows a first exemplary data format for a Mode S message.

The present invention may be further understood with reference to the following description of preferred exemplary embodiments and the related appended drawings, wherein like elements are provided with the same reference numerals. The exemplary embodiment of the present invention is described with reference to the Mode Select Beacon System ("Mode S") and the interpretation of Mode S messages by a passive radar. However, those of skill in the art will understand that the present invention is not limited to correcting Mode S messages and may be applied to any system where error correction may be used to correct defects in passively detected messages.

FIG. 1 shows an exemplary Mode-S air traffic control system 1 which illustrates a Mode S ground station and two exemplary aircraft 20 and 30 which include Mode S transponders. The Mode S system 1 is a bidirectional one-to-one datalink for ground to air communication. Those of skill in the art will understand that using two aircraft to illustrate the system is only exemplary and that the Mode S ground station 10 may track any number of aircraft with its range. For example, in a busy metropolitan area such as New York, the Mode S system 1 may be tracking tens or even hundreds of aircraft. In addition, those of skill in the art will understand that the Mode S ground station 10 may include a variety of components in addition to the radar for processing both signals to be transmitted and signals received by the Mode S ground station 10 and sending the information contained in these signals to the systems and users which require the information, e.g., control tower, airport operations, etc.

The Mode S system 1 works in the following manner. The Mode S ground station 10 selectively interrogates a single aircraft by sending a message addressed to the selected aircraft. For example, the Mode S ground station 10 may desire to communicate with the aircraft 20. The Mode S ground station 10 will transmit a message to the aircraft 20 using a selected format. Exemplary formats will be described in greater detail below. The selected format will include an addressing portion which contains a unique address for the aircraft 20, i.e., the Mode S transponder address. Other aircraft (e.g., the aircraft 30) may receive the message transmitted by the Mode S ground station 10, but the other aircraft will ignore the message because the unique address included with the message will not correspond to the unique address of these aircrafts' Mode S transponders. The aircraft 20 will receive the message and determine that the message is directed to the aircraft 20 based on the correspondence between the unique address of the Mode S transponder and the address included in the message. The aircraft 20 may then respond to the message sent by the Mode S ground station 10. The terms messages, interrogations, requests, responses, and replies will be used throughout this description to describe the communication (in either direction) between the Mode S ground station and the Mode S transponder aboard the aircraft.

The Mode S transponder included on the aircraft allows the aircraft to receive and process the interrogation messages sent by the Mode S ground station 10 and respond to these messages with reply messages. The Mode S transponder allows the aircraft 20 and 30 to determine if the message is directed to the specific aircraft 20 and/or 30. The messages sent from the aircraft 20 and 30 to respond to the interrogations of the Mode S ground station may include information such as altitude, air speed, location information, etc. There are many advantages associated with the Mode S system 1 including the elimination of garble or overlapping responses of two aircraft being at the same distance from the radar because the Mode S system 1 interrogates only one aircraft at a time, the reduction of false replies uncorrelated in time ("FRUIT") or responses which do not correspond to the expected aircraft (e.g., responses generated during interrogation from another radar system), and a data format which allows unique identification for every aircraft in the world.

FIG. 2 shows an air traffic control system 100 including a Mode S system with the addition of a passive system. The combined system 100 includes a Mode S ground station 110, a passive ground station 140 and two exemplary aircraft 120 and 130 which are equipped with Mode S transponders. The Mode S portion of the combined system 100 operates in the same manner as described above for the Mode S system 1 with reference to FIG. 1.

The passive system is a passive radar, which, without emitting any active signals, derives aircraft information by monitoring both the interrogation transmissions from the Mode S ground station 110 and the responding reply transmissions from the aircraft transponders. An example of a passive system is the PASSUR™ System by Megadata Corporation of Bohemia, N.Y. More information on the PASSUR™ System is provided by Megadata Corporation at www.passur.com. The signals for the passive system are received via the passive ground station 140. Those of skill in the art will understand that the passive ground station 140 may include a variety of components in addition to the radar for processing the signals received by the passive ground station 140 and sending the information contained in these signals to the systems and users which require the information.

Thus, the passive system may obtain or derive the same information (e.g., altitude, air speed, location, etc.) from the Mode S transponders in the aircraft 120 and 130 as the Mode S system. For example, when the Mode S transponder of the aircraft 120 sends a message in response to the Mode S ground station 110, the passive ground station 140 may also receive and process both the interrogation and the responding reply message from the aircraft 120. An airport facility, an airline or other air facility may install a passive system. The information derived from the passive system may be used for other airport systems such as irregular operations or the tracking of flight paths of aircraft. For exemplary uses of the information derived from a passive system see the exemplary products described by Megadata Corporation at www.passur.com.

Figure 3B:
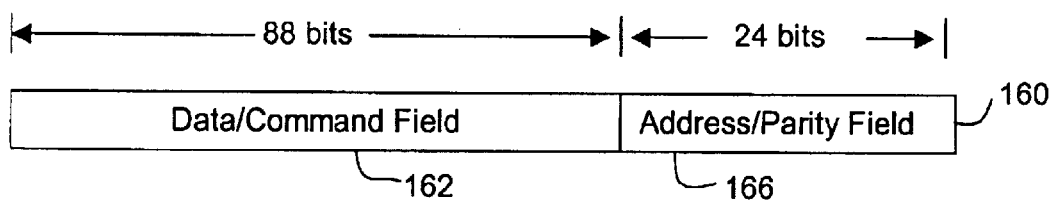
FIG. 3b shows a second exemplary data format for a Mode S message.
Figure 3C:
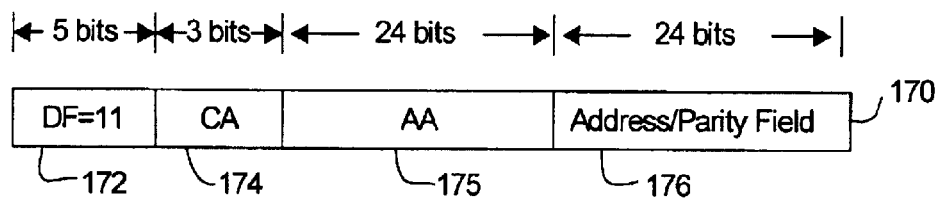
FIG. 3c shows a third exemplary data format for a Mode S message.

FIGS. 3a–c show three exemplary data formats for a Mode S messages to be passed between the Mode S ground station 110 and the Mode S transponders in the aircraft 120 and 130. The first exemplary data format 150 shown in FIG. 3a is a 56 bit surveillance format having a 32 bit data/command field 152 and a 24 bit address/parity field 156. This general data format 150 may be used for either ground-to-air (interrogation) or air-to-ground (reply) communications. The Mode S specifications define several formats for the command field 152. The data/command field 152 may contain, for example, Mode A and/or Mode C information. The format of the data/command field and the interpretation of its contents can be determined by examining the first five bits of the data/command field (termed the UF field in interrogations and the DF field in replies). For most Mode S formats, the address/parity field serves a dual function, containing both a 24-bit Cyclic Redundancy Check Code (CRC), for error detection, combined with the 24-bit address of the transponder being interrogated (in the case of an interrogation) or of the transponder which originated the transmission (in the case of a reply).

The Mode S specifications also define 112-bit formats in addition to the 56-bit format shown in FIG. 3a. FIG. 3b shows a simplified representation of such a format 160. The 112-bit formats allow for the transmission of additional kinds of data in the larger data/command field 162, however, for the purposes of this discussion there is no significant difference between the handling of 112-bit format messages and the handling of 56-bit format messages. As in the 56-bit case, for most 112-bit formats, the address/parity field 166 contains a combination of both a CRC, for error detection, and the 24-bit address of a particular transponder. The remaining discussion will use 56-bit examples, however their applicability to the corresponding 112-bit case should be assumed.

In both of the above cases, the address/parity field (156 or 166) contains a particular 24-bit address, combined with a Cyclic Redundancy Check (CRC) code, which allows the receiver to determine if the message has been received correctly. This is accomplished by effectively performing an 'exclusive or' (bit by bit addition without carry) between the 24-bit transponder address and the 24-bit CRC calculated on the data/command portion of the message. The receiver performs a CRC calculation on the received message, and if the result is the expected 24-bit transponder address, then the receiver is able to determine that the message has been received correctly.

The Mode S specification also defines certain 112-bit message formats, called extended squitter messages, in which a dedicated sub-field within the data/command field 162 contains the 24-bit address of the origination. For these message formats the correct result of the CRC calculation is a known constant value. Extended squitter messages are transmitted at periodic intervals by aircraft which are so equipped.

As described above, the Mode S system works on the general principle that the Mode S ground station 110 interrogates a specific aircraft (e.g., aircraft 120) and the specific aircraft responds to the interrogation. However, the Mode S ground station 110 cannot interrogate an aircraft unless it is aware that the aircraft is within the coverage area of the Mode S ground station 110. Thus, the Mode S ground station 110 sends "all-call" interrogations in a periodical way and continues the all-call transmission since there is no way of knowing the direction from which any particular aircraft will enter the coverage area. The Mode S transponders of the aircrafts respond to this all-call transmission and the responses include the Mode S addresses of the aircrafts.

The third exemplary data format 170 shown in FIG. 3c is a particular 56-bit format which is only transmitted by an aircraft transponder. This is the all-call reply format, which the transponder transmits in response to all-call interrogations from the radar. It is also spontaneously transmitted (squitted) by the transponder at periodic intervals in conjunction with the normal operation of TCAS by planes which are so equipped. In FIG. 3c, the 32-bit command/data field has been split into its 3 constituent subfields. The 5-bit DF field 172 has the decimal value 11, indicating that this is an all-call reply. The 3-bit CA field 174 encodes certain capabilities of the transponder, but is of no particular interest with respect to this discussion. The 24-bit AA field 175 contains the 24-bit address of the originating transponder. The 24-bit address/parity field 176 is similar to the previous two examples, 156 and 166, except that in this case the 24-bit CRC is exclusive-or'ed with a 24-bit word consisting of 20 bits of 0 and a 4-bit interrogation identifier ("ii"). Values of ii from 1 through 15 identify the particular Mode S ground station that sent the all-call interrogation to which this message is replying. In the case of a squitted all-call, an ii value of 0 is used. Each Mode S ground station in a particular area is assigned a unique ii value. A Mode S ground station receiving an all call reply uses the ii value to determine whether the transponder is responding to an all-call interrogation from itself or an all call interrogation from another radar.

In the case of the Mode S system shown in FIG. 1, the combination of an address or an ii into the same field as the CRC (as in FIGS. 3a and 3b) allows maximal usage of the limited number of available bits. In the case of an aircraft transponder which is looking for interrogations to its address, the transponder performs the CRC calculation on all interrogations, and if the result is its own 24-bit address, it responds to the interrogation. If the result is something else, then either an error was introduced in transmission, or the interrogation was intended for another transponder. In either case the transponders action is the same, it simply does not respond to the interrogation. Similarly, the Mode S ground station 10 in FIG. 1 knows which aircraft it has interrogated. It performs a CRC calculation on each reply to determine which one was transmitted by the transponder it interrogated.

With respect to interrogation formats which combine the 24-bit transponder address into the address/parity field, as shown in FIG. 3a and FIG. 3b, the passive ground station 140 shown in FIG. 2 has a more difficult job. One of its functions is to attempt to determine aircraft position by listening to both the interrogations from the ground station 110 and the replies from various aircraft transponders. It uses the timings of the interrogation and of the reply to determine the aircraft position. In order to perform this function it must receive both the interrogation and the reply without any knowledge of which 24-bit address the ground station will interrogate. Its task is further complicated by the fact that it must correctly decode the interrogation even when the radar antenna is pointing in a different direction. Radars emit special pulses, called sidelobe suppression (SLS) pulses, which are designed to prevent transponders from responding when the radar antenna is pointing in a different direction. When the radar is pointing away from the passive ground station these pulses cause errors in the received interrogation. Since the passive ground station has no way of knowing which 24-bit address was combined into the address/parity field, it cannot perform simple error correction, since it cannot determine when the correct result has been achieved.

With respect to the reply format shown in FIG. 3c, in which the 24-bit address appears in a dedicated field, the passive ground station 140 can determine the address of the originating transponder with some degree of confidence. When it performs the CRC calculation on this message it checks to see whether the result is one of the 16 legal ii codes (0–15). If the result is one of the legal codes, then it is likely that the 24-bit address is the correct address of the aircraft transponder that transmitted it. The probability of error in this determination is approximately 1 in $2^{20}$. This is less robust than the 1 in $2^{24}$ probability of error inherent in a 24 bit CRC because the passive ground station does not have any way of knowing which of the 16 legal ii values was combined with the CRC by the transmitter. However, from the point of view of the passive ground station 140, the 24-bit address contained in an all-call message may be considered to have been received relatively "in-the-clear."

In the case of an extended squitter message, the ground station can determine the address of the originating transponder with even more certainty, since the correct result of the CRC calculation is a known constant value. Thus, for the purposes of this discussion, Mode S extended squitter messages can also be considered to have sent the 24-bit address of the transponder "in-the-clear."

The exemplary embodiment of the present invention allows for the passive system of the combined system 100 to perform error correction on interrogations it receives. The exemplary embodiment allows for error correction on the basis of the passive system maintaining a set of possible correct addresses (or outcomes) which may be used by the error checking algorithm to determine whether error correction has been successful. The exemplary embodiment of the present invention will be described with reference to FIG. 4 which shows exemplary passive ground station 140 in greater detail, FIG. 5 which shows an exemplary process 300 for processing reply messages received by a passive system, and FIG. 6 which shows an exemplary process 400 for processing interrogation messages received by a passive system.

Figure 4:
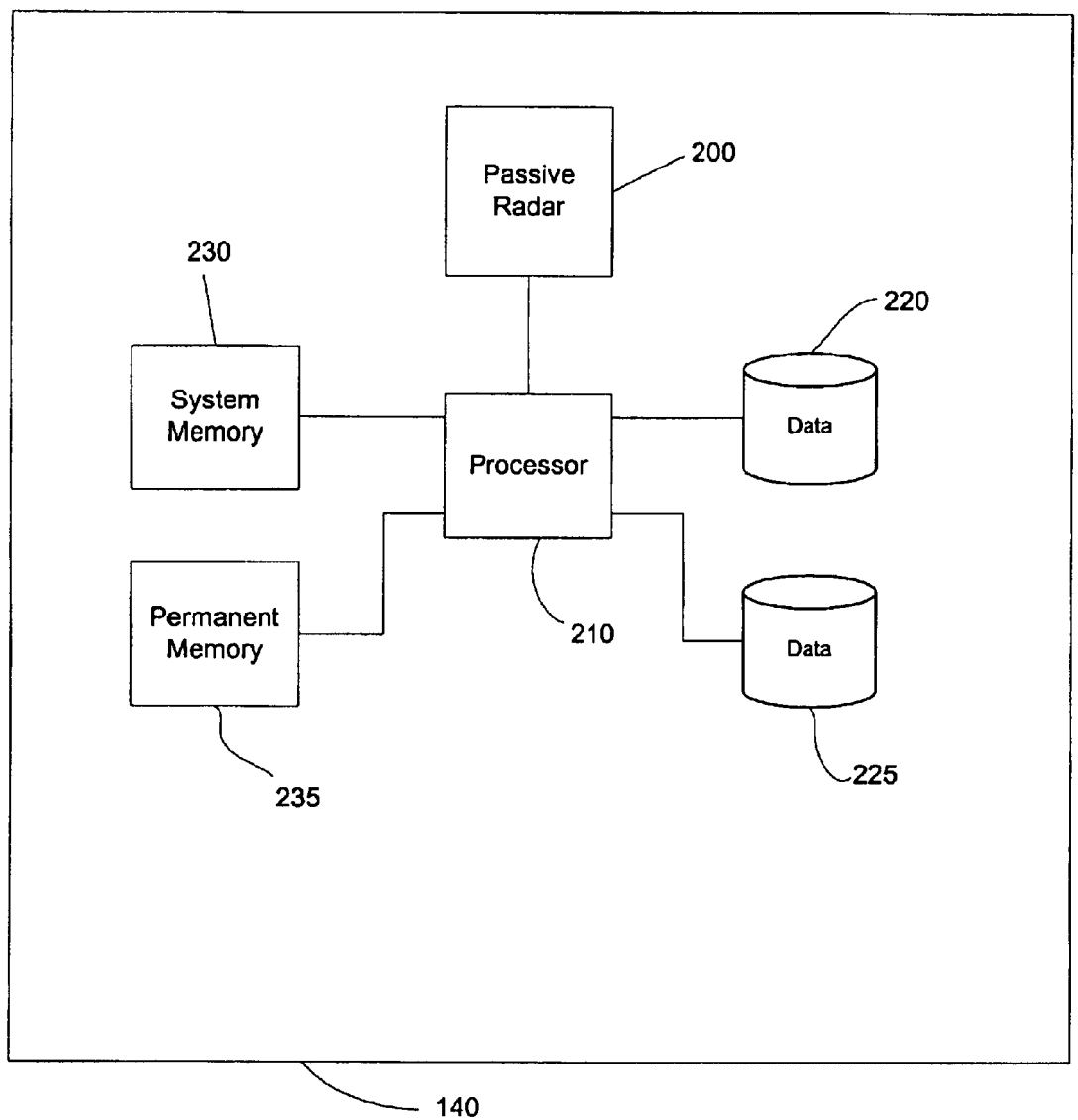
FIG. 4 shows an exemplary passive ground station 140 according to the present invention.

FIG. 4 shows additional details of the exemplary passive ground station 140 of FIG. 2. The passive ground station 140 includes a passive radar 200, a processor 210, two exemplary databases 220 and 225, a system memory 230 and a permanent memory 235. The operations carried out by each of these components will be described in greater below. Those of skill in the art will understand that the components shown for the passive ground station 140 are only exemplary and that a passive ground station may not include all the components or may include additional components not shown in FIG. 4. In addition, the components shown for the passive ground station 140 may be located remotely from each other. For example, the processor 210, the databases 220 and 225, the system memory 230 and the permanent memory 235 may be located within an operations building which is remote from the passive radar 200.

Figure 5:
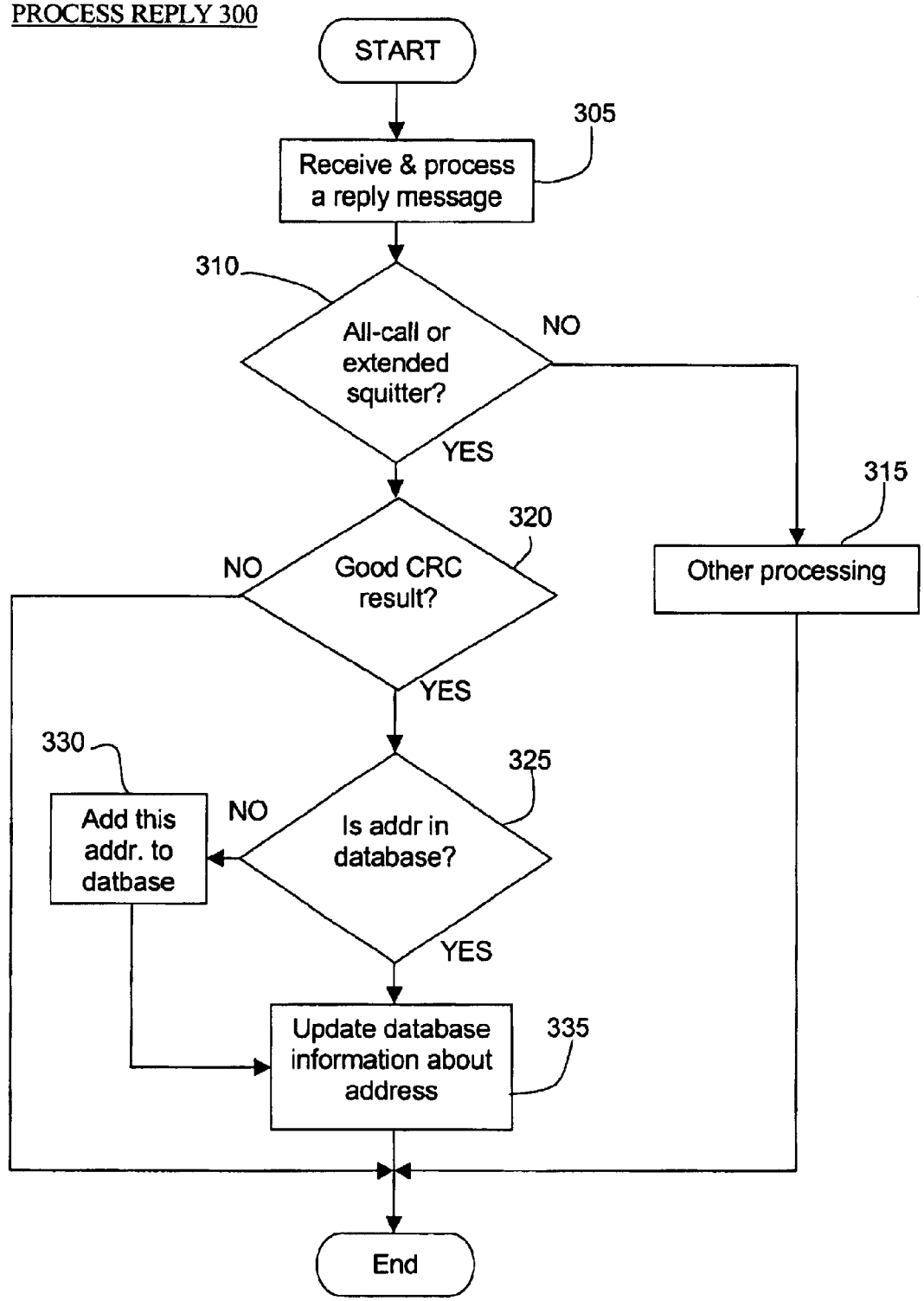
FIG. 5 shows an exemplary process for processing Mode S reply messages received by a passive system according to the present invention.

Starting with step 305 of the process 300 of FIG. 5, the passive ground station 140 receives a reply message from a Mode S transponder of an aircraft (e.g., aircrafts 120 and 130 of FIG. 2) via the passive radar 200. The message is sent to the processor 210 which may access a software program, procedure or set of instructions contained in the system memory 230 (e.g., Random Access Memory ("RAM")) or the permanent memory 235 (e.g., hard drive) to process the message. It should be noted that the remainder of the exemplary embodiment is described in such a manner that the processor 210 is described as executing software to carry out certain functions associated with the exemplary embodiment of the present invention. The term processor should be understood to mean any computing device which may process instructions. However, those of skill in the art will understand that the software implementation is only exemplary and that some or all of the described functions may be carried out using hardware components. Processing the message may include for example, performing a CRC calculation on the message as received, extracting the data from the other fields in the data format, etc.

The process then continues to step 310 where it is determined by the processor 210 whether the message is of one of those formats in which the 24 bit address is transmitted "in-the-clear" by the aircraft Mode S transponder. As noted previously, in-the-clear refers to those message formats where the reply message format contains an explicit 24-bit address field within the message, and the reply message may be verified by either a known, fixed CRC calculation result (as in the case of an extended squitter message) or by comparison with a limited number of correct CRC results (as in the case of an all-call reply, where the CRC was combined with one of the 16 legal ii codes by the transponder). As noted previously, examples of in-the-clear transmissions include responses to Mode S all-call interrogations, all-call replies squitted as part of normal Traffic Collision Avoidance System ("TCAS") operation, certain Mode S extended squitter transmissions, etc.

If the message is one in which the 24-bit address is not transmitted in-the-clear, the process proceeds to step 315, where the passive system 140 performs other processing on the message. One example of such processing is matching the reply with known interrogations and using the relative timings and other information to determine the position of the aircraft. The details of that processing are not relevant to the present invention.

If the reply message is determined to be one of those types with the address in-the-clear, the process then continues to step 320, where it is determined whether the CRC calculation returned an acceptable value for the reply message type (i.e. a legitimate ii or the expected fixed value, depending on the message format). If the CRC is incorrect, the message is discarded and the process is complete.

If the CRC is correct, the process then continues to step 325 where it is determined whether the 24-bit address contained in the message is already in the database of aircraft known to be flying in the covered area. If the address is not currently stored, a new entry is created and stored for this address in step 330, e.g., in database 220. Those of skill in the art will understand that there may be additional criteria which are used to narrow the number of entries which are stored in the database 220. For example, there may be a threshold criteria for the number of "in the clear" messages from a particular transponder (e.g., 3 in the clear messages) before the address is fully incorporated into to the database 220. The address may be stored in the database the first time it is decoded, but it may not be fully incorporated (e.g., used as a verified address) until it meets the criteria. Another example criteria may be a time threshold where the same address must be seen within a specified time period (e.g., 2 minutes) for it to be fully incorporated into the database 220.

Whether the address was previously entered into the database 220 or if the address is newly added into the database 220, the process continues to step 335, where the database 220 is updated to reflect that a message has been received from the transponder with a matching address, thereby confirming that the aircraft associated with the 24-bit address is still flying in the airspace being monitored. Some examples of information which might be retained are the time at which the last such message was received, the number of times that an in-the-clear message was received from this 24-bit address, or the timing distribution of those receptions. These are examples, and other information may also be retained all of which enable the passive system 140 to determine that 24-bit address is associated with a real plane currently flying in the covered airspace. This database 220 is the primary output of the process 300 in FIG. 5, and can be used to perform error correction for those message formats, both reply messages and interrogations, in which the 24-bit address is combined with the CRC in a single 24-bit field (i.e. not sent in-the-clear).

Figure 6:
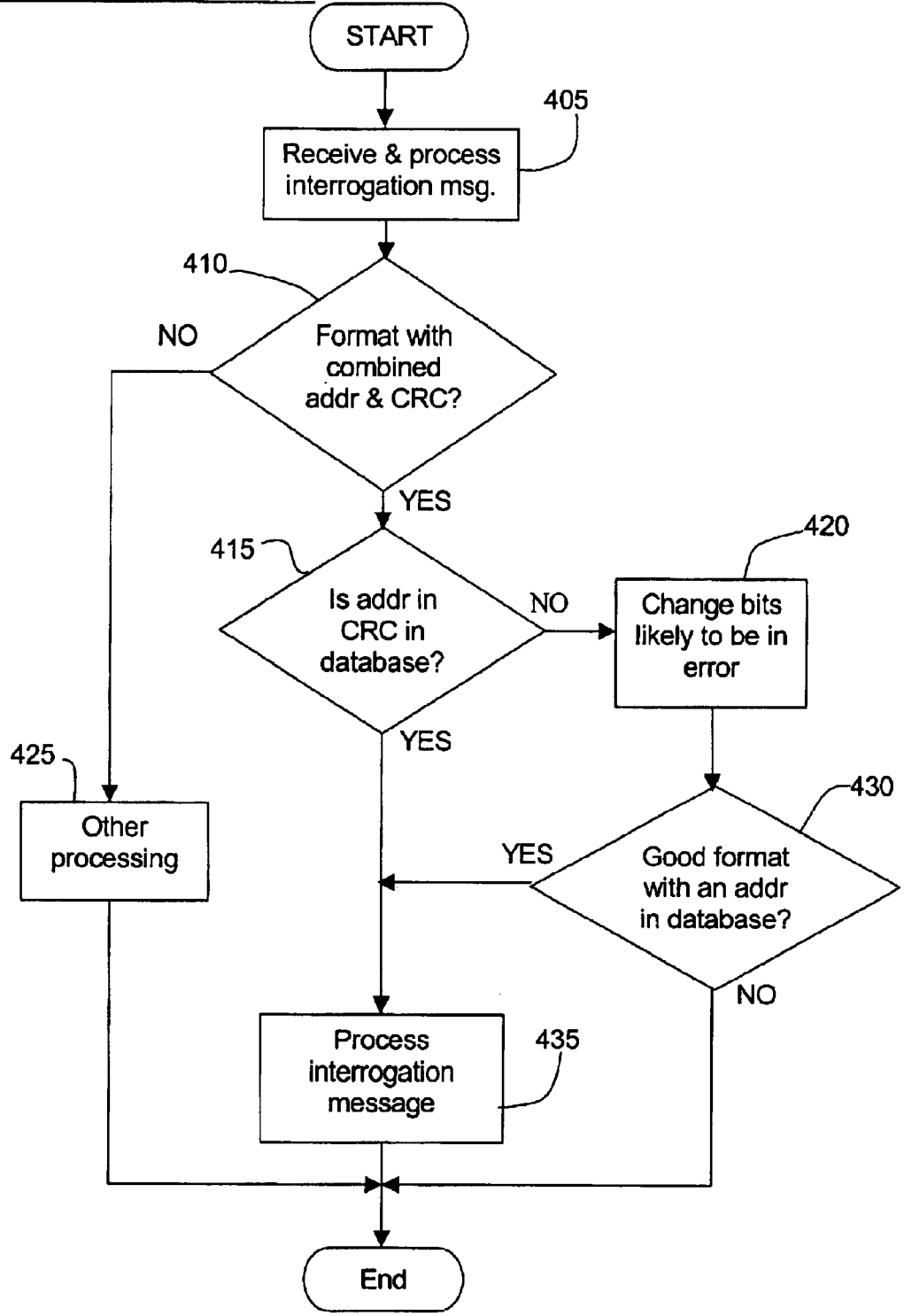
FIG. 6 shows an exemplary process for processing Mode S interrogation messages received by a passive system according to the present invention.

The processing of interrogations, shown in process 400 in FIG. 6, is an example of how the database 220 may be used to assist in the error correction of interrogations received by the passive system 140. Starting with step 405 of the process 400 of FIG. 6, the passive ground station 140 of FIG. 2 receives an interrogation message from the Mode S ground station 110 via the passive radar 200. The message is sent to the processor 210 which may access a software program, procedure or set of instructions contained in the system memory 230 (e.g., Random Access Memory ("RAM")) or the permanent memory 235 (e.g., hard drive) to process the message. Processing the message may include for example, performing the CRC for the message as received, extracting the data from the other fields in the data format, etc.

Processing then proceeds to step 410 where it is determined if the format of the interrogation message is one of those in which the 24-bit Mode S address is combined with the CRC in the address/parity field. If it is not, the process then proceeds to step 425, which performs other processing of that message, as required for the operation of the system.

It should be noted that, since at this point it is not yet known whether the message was received without error, the decision at step 410 must take into account the possibility that the contents of the UF field, which determine the message format, may have been corrupted. As noted previously, one of the primary purposes of performing error correction on interrogations is to counteract the effect of SLS pulses when the radar antenna is not facing the passive ground station 140. The field most affected by these pulses is the UF field. The step 425 is invoked only for those messages which can positively be ruled-out as possibly being of a format that combines the CRC and address.

If the interrogation format is (or could be) one in which the address is combined with the CRC in the address parity field, then this message is one for which the passive system 140 must perform additional processing in order to determine whether the message has been received correctly. In step 415, the message is examined to determine whether it may have been received incorrectly. This includes two determinations: (1) that the UF field matches one of the legal formats for an interrogation; and (2) that the CRC calculation yields one of the addresses in the database 220 created by the process 300. If the message matches these criteria, it is passed to step 435, which performs processing of the interrogation necessary for the functioning of the passive system 140, but which is unrelated to the error correction of the present invention.

If the message appears to contain an error, i.e., the message does not meet the criteria defined above, the process continues to step 420, where the message is examined to determine those bits most likely to have been received in error. The error correction procedure includes the changing of the bits most likely to be corrupted. This step expects that most of the damage will have been due to the SLS pulses, and weights its decisions accordingly. For example, the SLS generally introduces random errors into the first several bits of the message. Thus, the initial steps of error correction may focus on these bits. Other error introducers such as TCAS may corrupt different bits and these bits may be focused on if the error correction focused on the SLS pulses does not completely fix the message bits. In a further example, the processor 210 may take a sample of the waveforms received by the passive radar 210 and determine the bits most likely to have an error from that waveform.

The success of the error correction effort is determined in step 430, where the CRC calculation of the corrected message is checked against the database 220. It should be understood that steps 420 and 430 may represent an iterative process, in which a number of error correction strategies may be attempted. In all cases, the success or failure of these strategies in correcting possible receive errors is determined by the test at step 430, which again uses the database 220 produced by the process 300. This determination is affected by factors other than the mere presence of the 24-bit address in the database, including the number of in-the-clear replies and their timing distribution.

This process relies on the expectation that a radar ground station only does specific interrogations of aircraft currently flying in its airspace. The process does have the effect of reducing the effective strength of the 24-bit CRC in detecting errors for interrogations received by the passive ground station 140. This comes about because instead of a single correct CRC (as would be the case if the passive ground station 140 knew which plane was being interrogated), the passive ground station must consider as possibly correct CRCs all of the addresses of planes currently flying in the monitored airspace. However, in practical application, the number of planes actually flying in the monitored airspace is small with respect to the $2^{24}$ possible CRCs. The number of Mode S equipped planes in any given airspace is highly variable, but even in a very busy airspace will usually be below 300. If we assume 256 planes, or $2^8$, then this does reduce the effective strength of the CRC as an error detection mechanism from 1 in $2^{24}$ to 1 in $2^{16}$ (24–8). However, as a practical matter, this mechanism has been found to allow for very effective error recovery and allows the passive ground station to make use of interrogations which could not otherwise have been processed.

If error correction is successful, processing of the corrected message proceeds at step 435 in exactly the same manner as if the message had been received correctly. The details of the processing performed at step 435 are not the concern of the present invention. Those of skill in the art will understand that the example given in process 400 only concerns the error correction of interrogations, but the same technique can similarly be employed in the error correction of received replies as well.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A method, comprising the steps of:
   receiving a message including bits corresponding to an identifier, the identifier including a unique address;
   extracting the unique address from the identifier;
   comparing the unique address to a set of predetermined addresses;
   changing selected ones of the identifier bits when the unique address is not one of the set of predetermined addresses, wherein the changing of the identifier bits changes a value of the unique address in the identifier;
   re-comparing the updated unique address to the set of predetermined addresses; and
   processing the message when the unique address matches one of the set of predetermined addresses.

2. The method of claim 1, wherein the message is one of an interrogation from a Mode S ground radar and a reply from a Mode S aircraft transponder.

3. The method of claim 1, wherein the identifier bits include the unique address combined with a CRC check sum.

4. The method of claim 1, wherein the unique address corresponds to a transponder for an aircraft.

5. The method of claim 1, wherein the message is received by a passive radar ground station.

6. The method of claim 1, wherein the changing step and re-comparing step are repeated until there is a match between the unique address and one of the set of predetermined addresses.

7. The method of claim 1, wherein the selected ones of the identifier bits are determined based on damage to the message from an SLS pulse.

8. A method, comprising the steps of:
   receiving an in-the-clear message from an aircraft transponder at a passive ground station, the message including an identifier, the identifier including a unique address for the aircraft transponder;
   extracting the address from the identifier;
   determining whether the address has been previously stored in a set of addresses corresponding to aircraft in a range of the passive ground station;
   storing the address in the set of addresses when the address has not been previously stored;
   receiving an interrogation from an active ground station at the passive ground station, the interrogation including the unique address for the aircraft transponder; and
   error correcting the interrogation with the set of addresses.

9. The method according to claim 8, wherein the in-the-clear message includes one of an all-call reply message and a squitted message.

10. The method according to claim 9, wherein the identifier of the all-call reply message includes the unique address combined with an interrogation identifier of the active ground station to which the aircraft transponder is replying.

11. The method according to claim 8, wherein the aircraft transponder and the active ground station are Mode S capable.

12. The method according to claim 8, further comprising the steps of:
   storing additional information corresponding to each of the addresses stored in the set of addresses; and
   updating the additional information when an in-the-clear message is received corresponding to each of the addresses in the set of addresses.

13. The method according to claim 12, wherein the additional information includes one of a time the last in-the-clear message was received for each address, the number of in-the-clear messages received for each address and a timing distribution of in-the-clear messages for each address.

14. The method according to claim 8, wherein the error correcting step includes the substeps of:

comparing the unique address in the interrogation to the stored set of addresses;

changing selected ones of bits corresponding to the identifier of the interrogation when the unique address is not one of the set of addresses, wherein the changing of the identifier bits changes a value of the unique address in the identifier;

re-comparing the updated unique address to the set of addresses; and processing the interrogation when the unique address matches one of the set of addresses.

15. A system, comprising:

a passive radar receiving a message including bits corresponding to an identifier, the identifier including a unique address;

a database including a set of predetermined addresses; and a processor comparing the unique address to the set of predetermined addresses and changes selected ones of the identifier bits when the unique address is not one of the set of predetermined addresses, wherein the changing of the identifier bits changes a value of the unique address in the identifier.

16. The system of claim 15, wherein the processor re-compares the updated unique address to set predetermined addresses and processes the message when the unique address matches one of the set of predetermined addresses.

17. The system of claim 15, wherein the message is one of an interrogation from a Mode S ground radar and a reply from a Mode S aircraft transponder.

18. The method of claim 15, wherein the identifier bits include the unique address combined with a CRC check sum.

19. The method of claim 15, wherein the unique address corresponds to a transponder for an aircraft.

* * * * *